United States Patent [19]

Mika

[11] Patent Number: 5,517,354
[45] Date of Patent: May 14, 1996

[54] ADJUSTABLE MICROSCOPE BASE

[75] Inventor: Mark L. Mika, Newfane, N.Y.

[73] Assignee: Wilson Greatbatch Ltd., Clarence, N.Y.

[21] Appl. No.: 233,064

[22] Filed: Apr. 26, 1994

[51] Int. Cl.⁶ .................................................. G02B 21/26
[52] U.S. Cl. ........................................ 359/394; 359/391
[58] Field of Search ................................ 359/368–398, 359/896, 900; 248/162.1, 163.1, 644

[56] References Cited

U.S. PATENT DOCUMENTS

| | | | |
|---|---|---|---|
| 328,277 | 10/1885 | Bausch | 359/390 |
| 536,552 | 3/1895 | Swift | 359/391 |
| 2,604,815 | 7/1952 | Engelmann | 359/390 |
| 2,730,923 | 1/1956 | Gorham et al. | 359/390 |
| 4,405,202 | 9/1983 | Kimball | 359/391 |
| 5,052,788 | 10/1991 | Tachibana | 359/391 |

OTHER PUBLICATIONS

"Micromanipulators for Science and Industry" Hacker Instrument, Inc. pp. 1–7.

*Primary Examiner*—Thong Q. Nguyen
*Attorney, Agent, or Firm*—Hodgson, Russ, Andrews, Woods & Goodyear

[57] ABSTRACT

An ergonomic adjustable microscope base comprising a base positioned on a support surface; rubber bumpers to prevent the base from sliding on the support surface; fasteners for attaching and locking a microscope in a nonmovably mounted relationship with the upper surface of the base; and manually rotatable and lockable adjusters, located at each rearward corner of the base and operatively associated with the base, to provide for selectively varying the rearward vertical height of the base and mounted microscope relative to the support surface, thereby providing a range of forward tilt angles so that a user of the microscope is able to maintain a more neutral position in the neck, back, and shoulder areas.

10 Claims, 3 Drawing Sheets

ADJUSTABLE MICROSCOPE BASE

BACKGROUND OF THE INVENTION

The present invention relates to microscopes, and microscope accessories. More particularly, the present invention relates to an ergonomic support device comprising an adjustable base attachable to the base of a microscope.

Standard microscopes require that the operator lean forward in a static position to look into the instrument, and maintain that position when operating the instrument for extended periods of time. Thus, conditions that may be encountered while operating a microscope include repetitive motion, awkward posture, and stress, which are contributing factors to cumulative trauma disorders. Cumulative trauma disorders (CTDs) include several syndromes characterized by eye strain, backaches, neck pain, headaches, and repetitive-strain injuries such as carpal tunnel syndrome. CTDs are estimated to account for more than 50 percent of all workplace illnesses, with as many as 14 to 18 million cases in the U.S. work force.

An ergonomic support device for a microscope which would adapt the instrument to human capabilities and limitations associated with its operation, is desirable. In that respect, the present invention is directed to an adjustable microscope base which is attachable to a microscope. The base comprises dual adjusters which can be used to raise or lower the pitch or tilt angle of an attached microscope so that the operator is forced to maintain a more neutral position in the neck, back, and shoulder areas. Thus, the present invention can reduce the level of discomfort and risk of CTDs previously encountered due to the constant load on the neck, back and shoulders created by the forward lean in operating a microscope.

PRIOR ART

Devices used to provide a tilting arrangement for optical instruments have been described previously in the art. One such device is described in U.S. Pat. No. 2,604,815 to Engelmann, and comprises a table adapted to detachably receive the instrument and is provided with at least three legs. The rear leg, when laid down, provides a tilting arrangement to the attached microscope. However, the pitch of the instrument is not adjustable; thus the operator is limited to only a single angle of inclination.

U.S. Pat. No. 2,730,923 to Gorham et al. discloses a unitary microscope-support and lamp allowing the use of the microscope in an upright position, or in a forwardly tilted position, wherein, in either case, the optical axis between the microscope lamp is maintained in correct relation to the optical axis of the microscope. The unitary microscope support and lamp is a rather bulky device which is limited in the adjustability of the pitch of the attached instrument.

U.S. Pat. No. 5,052,788 to Tachibana, discloses a microscope that also has a telescope function. The microscope has a base, an arm which is rotatably attached to the base, and a microscope barrel to which can be attached a telescope tube. To utilize the telescope function, the arm is rotated in a rearward direction, away from the position of the operator.

Therefore, there is a need for an adjustable microscope base, connectable to the bottom of a microscope, which comprises adjusters used to raise or lower the forwardly inclined pitch of the entire assembly (the base and the microscope) to various degrees so as to provide operating conditions that are individually suitable to an operator for maintaining a more neutral position in the neck, back, and shoulder areas.

OBJECTS

It is therefore an object of the invention to provide an ergonomic support device comprising an adjustable base attachable to the base of a microscope.

Further, it is an object of the present invention to provide an adjustable base, attachable to the base of a microscope, that provides a range of forward tilt angles to the entire assembly by raising the rearward portion of the base, thereby obviating the discomforts created by the forward lean in operating a microscope.

Another object of the present invention is to provide an adjustable base, attachable to a microscope, that provides a range of adjustment, preferably from between about 0 degrees to about 15 degrees, relative to the top of the work surface on which the assembly sits, so as to provide the microscope at a comfortable position to a user, depending on that user's physical characteristics such as height.

These and other objects will become increasingly apparent to those of ordinary skill in the art by reference to the following detailed description and the drawings.

DETAILED DESCRIPTION OF THE INVENTION

In describing the invention and in referring to the figures, the terms "rearward" and "forward" simply refer to the orientation of the adjustable base, and the microscope adjustably attached thereto (the combination being termed the "assembly"), relative to the position of the operator of the assembly. Thus, "rearward" refers to a direction furthest from an operator using the assembly; whereas, "forward" refers to a direction toward the operator.

Figure 1:
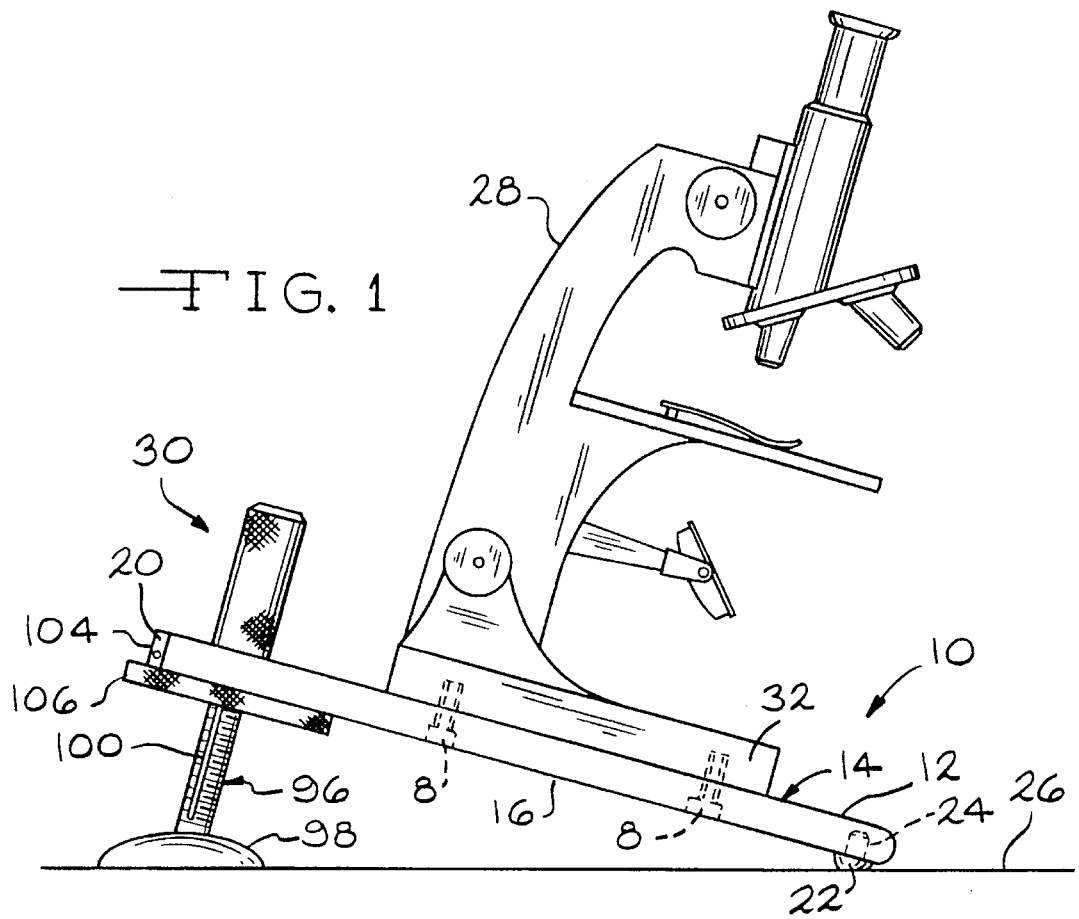
FIG. 1 is a side elevation view of an adjustable microscope base 10, with microscope 16 mounted thereon, wherein dual adjusting means are positioned to raise the rearward vertical height to provide a forwardly inclined pitch of the entire assembly relative to support surface 20.
Figure 2:
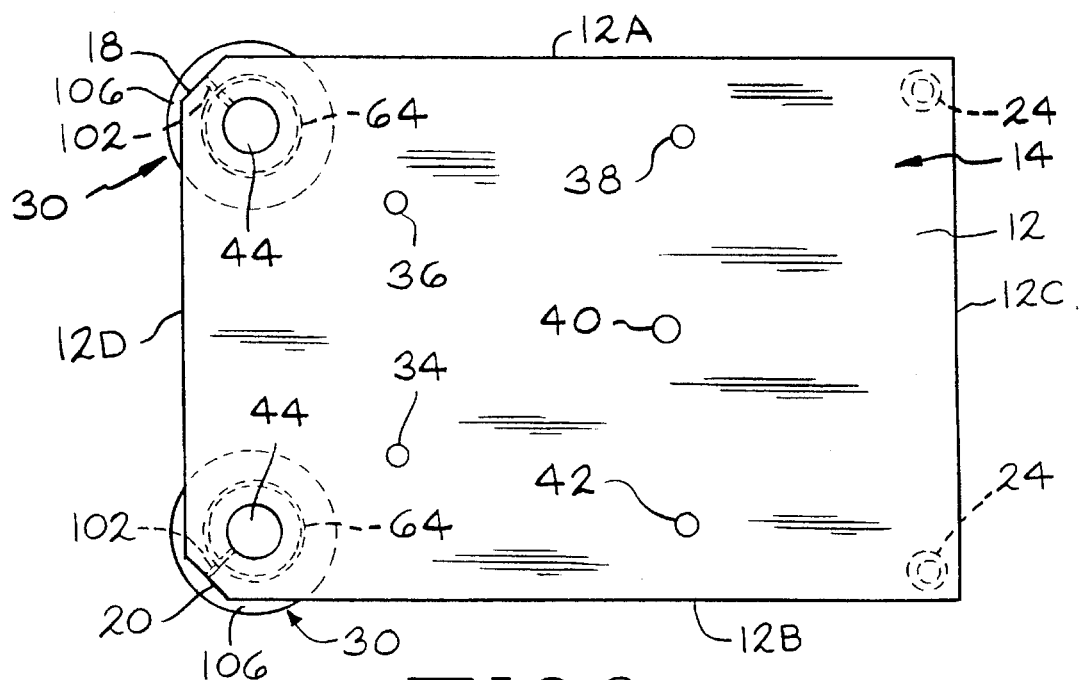
FIG. 2 is a top perspective view of an adjustable microscope base 10.

Referring now to the drawings, FIGS. 1 to 5 show one embodiment of the adjustable base 10 of the present invention. Adjustable base 10 is preferably fabricated as an integral member and includes a rectangular plate 12 having opposed side walls 12A and 12B that extend to and meet with spaced part front and rear walls 12C and 12D joined to an upper surface 14 and an under side 16. As shown in FIG. 2, the rearward corners 18 and 20 formed at the junctions of opposed side walls 12A and 12B with rear wall 12D are beveled. Plate 12 can be made of a suitable metal material that has been cut to size and formed to the proper shape, or base 10 can be made of a plastic material that has been injection molded to shape, or any other suitable fabricated material. A preferred material is a plastic comprising polyvinyl chloride (PVC).

Figure 3:
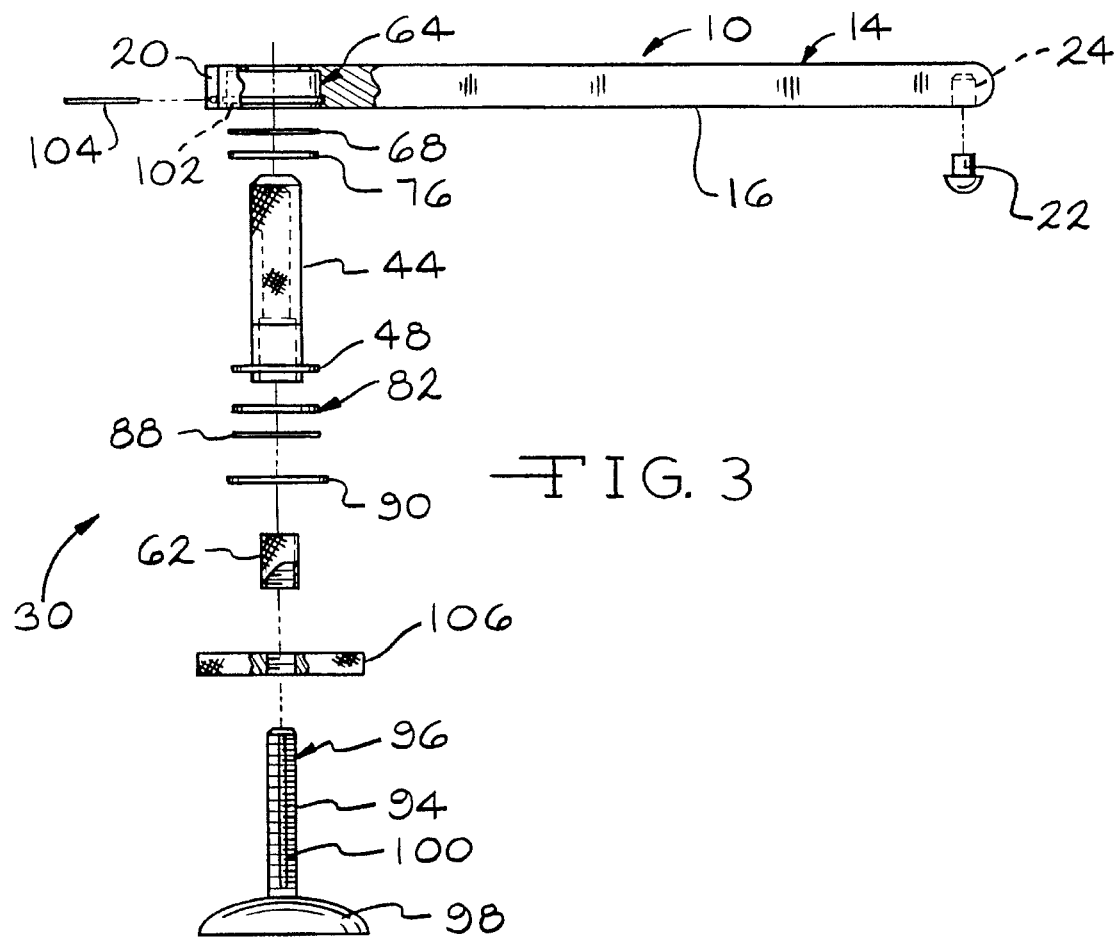
FIG. 3 is an exploded view of the adjustable microscope base shown in FIG. 1.

As shown in FIGS. 1 to 3, a pair of friction means 22 are positively firmly received in suitable openings 24 (shown in dashed lines in FIGS. 1 to 3) inletted into the under side 16 adjacent to the forward corners formed at the junctions of opposed side walls 12A and 12B with front wall 12C. Friction means 22 and 30 comprise foot means that prevent base 10 from sliding on a support surface 26. Preferred friction means comprise rubber stem bumpers.

A microscope 28 is positioned on the upper surface 14 of base 10 and is releasably attached thereto to form an assembly. Provided adjacent to the rearward corners 18 and 20 of the base 10 (FIG. 2) are a pair of dual adjusting means 30 which are used to raise and lower the forwardly inclined pitch of the entire assembly relative to the support surface 26, as will be explained in detail presently. This construction provides a range of forward tilt angles to the entire assembly so as to provide the microscope 28 at a comfortable position for a user. The support surface 26 (FIG. 1) may be a laboratory benchtop, tabletop, desktop, or other like surface upon which microscope 28 operatively associated with the adjustable base 10 is positioned.

A fastening means is used for releasably attaching and locking the base 32 of the microscope 28 (FIG. 1) in a nonmovably mounted relationship with respect to adjustable base 10, such that microscope 28 is firmly and operatively in contact with upper surface 14 of adjustable base 10. In one exemplary but non-specifically limiting form, the fastening means are threaded fastener means comprising bolts 8 (FIG. 1) having their heads positioned on the under side 16 of adjustable base 10 (FIG. 2), and their threaded shafts extending upwardly beyond the corresponding oversized apertures 34, 36, 38, 40, and 42 (FIG. 2) and through upper surface 14 of base 10 (FIGS. 1 to 3), to be received by engaging means (not shown), such as threaded sockets drilled or otherwise provided into microscope base 32. A lock washer (not shown) can be mounted on the threaded shaft of each bolt, between each head and the under side 16 of adjustable base 10, so that when the fastener means are tightly received by the engaging means in microscope base 32, microscope 28 is firmly locked and snugly fit to upper surface 14 of adjustable base 10. Other suitable fastening means, such as adjustable clips (not shown) that can be actuated to securely engage microscope base 32 and disengaged to release from base 32, may occur to those skilled in the art.

It is further contemplated by the scope of the present invention that base 10 may be formed as an integral member with microscope 28. In that respect and if for example microscope base 32 is made of a plastic or metal material formed in a casting process, base 10 and microscope base 32 can be formed integrally, as is obvious to those of ordinary skill in the art.

Adjustable base 10 is provided with the dual adjusting means 30 positioned adjacent to each of the rearward corners 18 and 20. The adjusting portion of provide for raising and lowering the forward portion of base 10 and microscope 18 assembly through an infinite number of vertical heights to thereby regulate the assembly through a range of forward tilt angles relative to support surface 26, so as to provide the microscope 28 at a comfortable position for the user. The adjusting means 30 are similar in construction and will therefore be described with respect to one of the pair for the sake of clarity.

Figure 5:
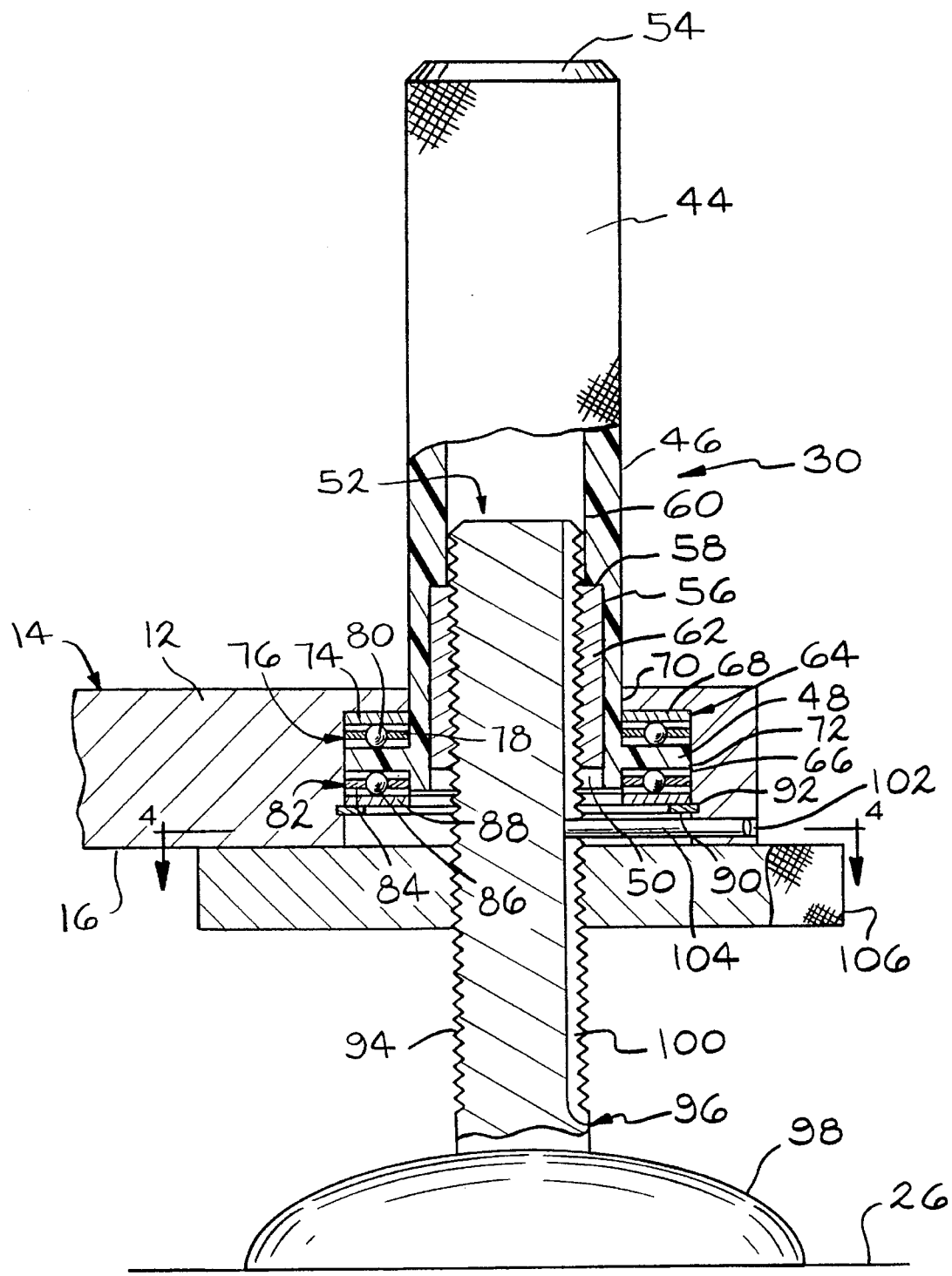
FIG. 5 is a partial cross-sectional view along line 5—5 of FIG. 4, on an enlarged scale, of adjusting means 50.

As shown in FIGS. 1, 3 and 5, the adjusting means 30 comprises a manually rotatable thimble sleeve 44 having a cylindrically shaped outer wall 46 provided with an annular web 48 spaced a relatively short distance axially along the length of sleeve 44 from a lower open end 50. Open end 50 leads to an inner passage 52 extending along the length of sleeve 44 to an opposite closing end wall 54. Inner passage 52 has a circular cross-section formed by a first cylindrical opening 56 extending part way along sleeve 44 to an annular ledge 58 that steps down to a second cylindrical opening 60 extending the remaining length of inner passage 52 to end wall 54. A cylindrically shaped bushing 62 is fixedly housed inside sleeve 44 with an outer wall provided in a friction fit with the cylindrical wall forming the first opening 56 and with an end of bushing 62 abutting ledge 58. The inner wall of bushing 62 is threaded while the exterior surface of bushing 62 is preferably knurled to ensure the friction fit.

In the illustrated embodiment of the present invention and as shown in FIGS. 2, 3 and 5, the thimble sleeves 44 comprising each of the adjusting means 30 are received in respective apertures 64 (apertures 64 are shown in dashed lines in FIG. 2) extending through plate 12 adjacent to each of the rearward corners 18 and 20. Representation aperture 64 is shown in cross-section in FIGS. 3 and 5, and comprises a first cylindrically shaped opening 66 provided into plate 12 from the under side 16 thereof and extending part way through the thickness thereof to an annular ledge 68 that steps down to a second opening 70 having a diameter less that opening 66. The second opening 70 of aperture 64 extends the remaining thickness of plate 12 to the upper surface 14 and is sized to provide for snugly receiving the cylindrically shaped outer wall of thimble sleeve 44 therein. The outer annular face 72 (FIG. 5) of web 48 of sleeve 44 is provided in a closely spaced and rotatable relationship inside opening 66. With this configuration, the majority of the knurled outer wall provided along the length of sleeve 44 extends upwardly beyond the upper surface 14 of base 10 to be readily accessible to a user desiring to manipulate the adjusting means 30.

A pair of opposed bearing means are positioned on either side of the annular web 48 of thimble sleeve 44 received in aperture 64 to facilitate rotational movement of sleeve 44 about the horizontal axis thereof. The bearing means comprises a first synthetic washer 74, preferably made of TEFLON™, and received in the first cylindrical opening 66 of aperture 64 with a side of washer 74 contiguous with ledge 68 and an inner circumference flush with second opening 70. A thrust bearing 76 surrounds the circumference of the outer wall 46 of sleeve 44 and is positioned intermediate web 48 of thimble sleeve 44 and washer 74. As shown in cross-section in FIG. 5, thrust bearing 76 comprises a washer 78 having a plurality of perforations sized to receive ball bearings 80 surrounded therein along a plane of the washer 78 and confined in this position by the synthetic washer 74 and web 48. Similarly, a second thrust bearing 82. comprising a washer 84 having a plurality of perforations and associated ball bearings 86 is provided between the other side of web 48 and a second synthetic washer 88. The bearing means comprising synthetic washer 74 and first thrust bearing 76 is thus confined in position between ledge 68 and web 48 which in turn supports the second thrust bearing 82 and synthetic washer 88 that are locked in position by a snap ring 90 fitted into an annular groove 92 provided in the wall forming the first cylindrical opening 66 of aperture 64. From this construction, it is apparent that with thimble sleeve 44 received in aperture 64, thimble sleeve 44 is free to rotate about its longitudinal axis journalled between thrust bearings 76 and 82 acting on opposite sides of web 48 and respective washers 74 and 88 and locked in position by snap ring 90.

As shown in FIGS. 3 and 5, the inner wall of bushing 62, received in a friction fit inside first cylindrically shaped opening 56 of thimble sleeve 44, is threaded to receive a threaded shaft 94 of a support means 96 with the lower end of shaft 94 pivotally joined (FIG. 1) to a friction means 98 positioned on the support surface 26. The pivotable engagement between shaft 94 and friction means 98 can be by any suitable means, such as a tab and receptacle structure (not shown), as is well known to those skilled in the art. The friction means 98 of support means 96 preferably comprises a disk of a material such as rubber, to prevent the rearward portion of adjustable base 10 from sliding on support surface 26 when the assembly is used to adjust a forward tilt angle of base 10. A channel-shaped groove 100 extends along the length of shaft 94, parallel to and spaced from the longitudinal axis thereof.

Figure 4:
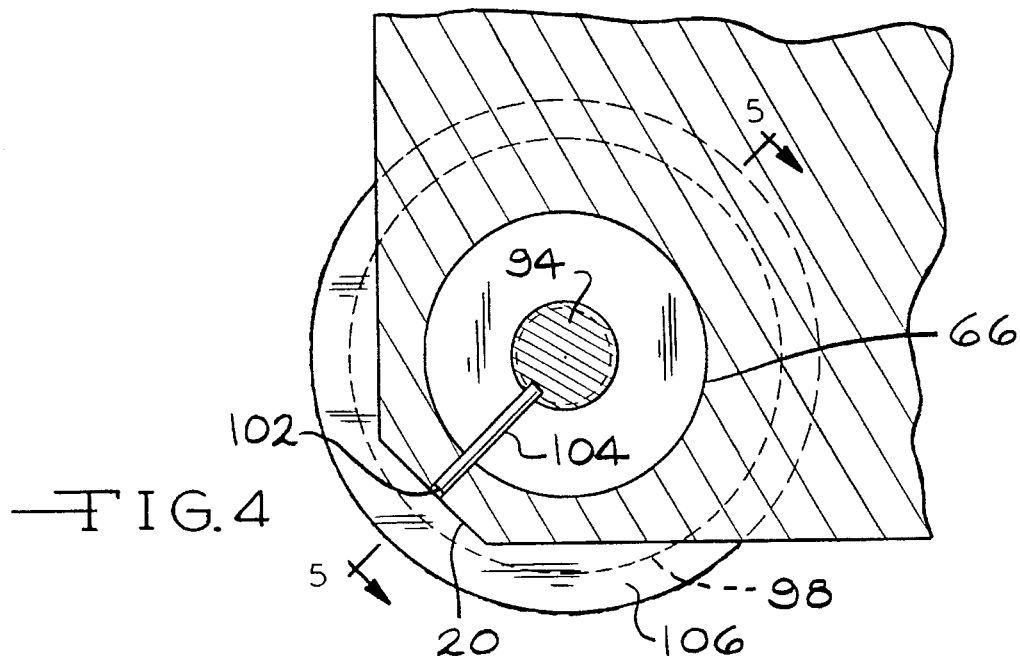
FIG. 4 is a partial view, along line 4—4 of FIG. 5, on an enlarged scale, of a rearward adjusting means 50 showing locking pin means 104.

As shown in FIGS. 2, 4 and 5, a cylindrical bore 102 extends radially inwardly into the interior of plate 12 from the bevelled corners 18 and 20 formed at the respective junctions of side walls 12A and 12B and rear wall 12D to communicate with the first opening 66 of the aperture 64 receiving thimble sleeve 44. As particularly shown in FIGS. 3 and 5, a dowel pin 104 fits into bore 102 with a terminal end of pin 104 received in the channel-shaped groove 100 in shaft 94. Pin 104 received in groove 100 provides for the threaded engagement between shaft 94 and bushing 62 of thimble sleeve 44 to adjust axially along the length of shaft 94 as sleeve 44 is rotated either in a first or second direction. This will be explained in detail hereinafter.

A jam nut 106, preferably made of aluminum, is threadingly received on threaded shaft 94 of support means 96 at a position intermediate the friction means 98 of support means 96 and the under side 16 of plate 12. Jam nut 106 serves to lock the threaded engagement between shaft 94 and bushing 62 to thereby lock the height adjustment for the rearward position of base 10 at a desired tilt angle, as will be explained in further detail presently.

IN USE

In continuing the example illustrated with respect to one of the two identical dual adjusting means 30 and with the arrangement of parts thereof in mind, to adjust the vertical height of the rearward portion of base 10 and thus the forward tilt angle of the entire assembly, jam nut 106 of each adjusting means 30 is threaded in a first, preferably counter-clockwise direction, to move nut 106 away from contact with the under side 16 of plate 12. The adjusting means 30 are then manipulated by firmly gripping the knurled surface of thimble sleeve 44 which can then be rotated to regulate the rearward vertical height of the base 10 and microscope 28 assembly through the preferred range of forward tilt angles relative to support surface 26. In that respect, thimble sleeves 44 are each preferably rotated in a clockwise direction to adjust the threaded relationship between shaft 94 and bushing 62 fit inside of sleeve 44 by retracting shaft 94 into sleeve 44. This serves to lower the height of the rearward portion of the base 10 to thereby decrease the forward tilt angle of the base 10 and microscope assembly 16 relative to support surface 26. Conversely, the thimble sleeves 44 are preferably rotated in a counter-clockwise direction to cause shaft 94 to extend out through sleeve 44 to cause the distance between friction means 98 and plate 12 to increase, thereby raising the height of the rearward portion of adjustable base 10. This serves to increase the forward tilt angle of the entire assembly relative to the support surface 20. It should be understood that as each thimble sleeve 44 is rotated in either a clockwise or counter-clockwise direction, pin 104 received in groove 100 prevents the shaft 94 from rotating along with sleeve 44 but instead provides for relative movement between sleeve 44 and shaft 94 to appropriately lower and raise the distance between foot 98 and the plate 12 to serve as an adjusting means for regulating the vertical height of the rearward portion of base 10 and provide a comfortable tilt angle for the assembly. At such time as the assembly has been adjusted to the comfortable tilt angle, jam nut 106 is rotated in the second, preferably clockwise direction to contact the under side 16 of plate 12 and thereby lock the threaded engagement of shaft 94 and bushing 62.

Thus in this manner, the forward tilt angle, i.e. the slope of adjustable base 10 relative to support surface 20, is adjustable through a range from about 0° in a lowermost extent (not shown), to a preferred height of about 15° in an uppermost extent as shown in FIG. 1. That way, the tilt angle of the attached microscope 16 can be adjusted to provide operating conditions, individually suitable to the user, for maintaining a more neutral position in the neck, back, and shoulder areas.

Once the desired tilt angle is achieved jam nut 106 which is threadingly received on shaft 94 of support means 96, may be rotated counter-clockwise and tightened against the under side 16 of plate 12 as a means for locking in place the exposed vertical height of shaft 94.

It should be understood that while the invention has been described in detail herein, the examples were for illustrative purposes only. Other modifications of the embodiments of the present invention that are obvious to those of ordinary skill in the art are intended to be within the scope of the appended claims.

What is claimed is:

1. An ergonomic adjustable base device for supporting a microscope and for regulating rearward vertical height of the microscope through a wide range of forward tilt angles related to a support surface to provide the microscope in an individually suitable operating condition, said device comprises:

(a) a base means in operative contact with a microscope in forming an assembly, wherein said base means is positioned on a support surface and comprises a plate member having at least four corners, two at a forward portion and two at an opposite rearward portion; and (b) an adjusting means located at each rearward corner of the base means, said adjusting means comprises a sleeve means extendingly upwardly beyond upper surface of said base means to be readily accessible for manipulation and a shaft means received by said sleeve means, said shaft means extending between said base means and the support surface, to provide for raising and lowering a vertical height of the rearward portion relative to an elevation of the forward portion of the base means through a wide range of adjustments to provide an incline to the base means sloping downwardly from the rearward portion to the forward portion, wherein the incline to the base means provides the microscope of the assembly at a comfortable operating position.

2. The adjustable base device of claim 1 wherein the adjusting means are rotatable.

3. The adjustable base device of claim 1 further including fastening means for attaching the microscope in a nonmovably mounted relationship with an upper surface of the base means.

4. The adjustable base device according to claim 3, wherein said fastening means comprise manually operable threaded shaft means which extend through apertures in the base means and are tightly received by engaging means on the microscope to be mounted, so that the shaft means has an axis of rotation which is generally perpendicular to a plane of said base means and so that upon rotation of said shaft means, the upper surface of said base means is moved into contact with said microscope.

5. The adjustable base device of claim 1 further including a first friction means provided on an underside of the base means, and a second friction means operatively associated with both a support means and the shaft means of the adjusting means located at the respective corners of the base means, to prevent the base means from sliding on the support surface.

6. The adjustable base device according to claim 1, wherein said adjusting means comprises:

(a) sleeve means having a generally cylindrical shaped outer wall, a threaded inner surface and an outwardly extending annular web rotatably housed inside an aperture of said base, wherein a portion of the sleeve means, located above said annular ring-shaped portion, extends outwardly through the aperture of said base means and is generally perpendicular to the plane of said base means so as to be accessible above the upper surface thereof to be readily accessible for manipulation;

(b) shaft means threadingly received inside the sleeve means; and (c) guide means associated with the shaft means, said guide means includes a bushing means fixedly housed inside sleeve means and threadingly receives shaft means such that the sleeve means is rotatably manipulatable to adjust the threaded relationship between the shaft means and the sleeve means while the guide means prevents the shaft means from rotating with the sleeve means, wherein appropriate rotatable manipulation of the sleeve means causes the shaft means to retract into or extend out of the sleeve means to thereby provide for raising or lowering the vertical height of the rearward portion of the base means.

7. The adjustable base device of claim 6 further including locking means associated with the shaft means to lock the threaded engagement of the shaft means and the sleeve means at the comfortable position.

8. The adjustable base device of claim 7 wherein the locking means comprise wheel means threadingly received on the shaft means and wherein the wheel means is manually rotatable on said shaft means until tightened against the underside of said base means as a means for locking into place the vertical height of said shaft means which is exposed below said base means.

9. The adjustable base device according to claim 6, wherein said guide means further comprises:

(a) a groove running along the length of, parallel to and spaced from a longitudinal axis of said shaft means; and (b) pin means partially housed in an opening in the base means and partially received in the groove means to prevent rotation of the shaft means relative to the base means and the sleeve means as the sleeve means is rotated to adjust the threaded engagement between the sleeve means and the shaft means and thereby provide the comfortable operating position.

10. A method for adjusting a microscope to regulate rearward vertical height of the microscope thereby raising or lowering the forwardly inclined pitch of the microscope relative to a support surface, said method comprises:

(a) providing an adjustable base means attached to the microscope in an nonmovably mounted relationship with an upper surface of the base means;

(b) providing rotatable adjusting means located at a rearward portion of the base means for selectively varying the rearward vertical height of the base means and the attached microscope relative to the support surface, said adjusting means comprises sleeve means extending upwardly from the base means to be readily accessible for manipulation, and shaft means received by said sleeve means and extending between said base means and the support surface; and (c) rotating the rotatable adjusting means causing the shaft means to retract into or extend out of the sleeve means thereby varying the rearward vertical height of the base means and the attached microscope thereby varying the forwardly inclined pitch of the attached microscope relative to the support surface.

\* \* \* \* \*